United States Patent
Tsubakisawa et al.

(10) Patent No.: US 8,303,409 B2
(45) Date of Patent: Nov. 6, 2012

(54) GAME APPARATUS AND COMPUTER READABLE STORAGE MEDIUM FOR SIMULATED MUSICAL INSTRUMENT PLAYING TECHNIQUE

(75) Inventors: Tomomi Tsubakisawa, Tokyo (JP); Makiko Ota, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 108 days.

(21) Appl. No.: 12/891,178

(22) Filed: Sep. 27, 2010

(65) Prior Publication Data

US 2011/0077077 A1 Mar. 31, 2011

(30) Foreign Application Priority Data

Sep. 28, 2009 (JP) ................................ 2009-222846

(51) Int. Cl.
*G10D 1/00* (2006.01)
(52) U.S. Cl. .............. 463/31; 84/314 R; 84/613; 84/722
(58) Field of Classification Search ............... 84/314 R, 84/600, 612, 722; 463/31, 35, 37
See application file for complete search history.

(56) References Cited

U.S. PATENT DOCUMENTS

| | | | | |
|---|---|---|---|---|
| 3,555,166 A | * | 1/1971 | Gasser | 84/600 |
| 6,162,981 A | * | 12/2000 | Newcomer et al. | 84/485 R |
| 7,459,624 B2 | | 12/2008 | Schmidt et al. | |
| 2004/0244566 A1 | * | 12/2004 | Steiger | 84/610 |
| 2006/0107826 A1 | * | 5/2006 | Knapp et al. | 84/724 |
| 2007/0221046 A1 | * | 9/2007 | Ozaki et al. | 84/612 |
| 2007/0234885 A1 | * | 10/2007 | Schmidt et al. | 84/722 |
| 2009/0188371 A1 | * | 7/2009 | Chiu et al. | 84/314 R |
| 2009/0253509 A1 | * | 10/2009 | Tripp | 463/37 |
| 2009/0258700 A1 | * | 10/2009 | Bright et al. | 463/31 |
| 2009/0291756 A1 | * | 11/2009 | McCauley et al. | 463/31 |
| 2010/0009749 A1 | * | 1/2010 | Chrzanowski et al. | 463/35 |

FOREIGN PATENT DOCUMENTS

JP 2000-288254 A 10/2000

* cited by examiner

*Primary Examiner* — Dmitry Suhol
*Assistant Examiner* — Jason Yen
(74) *Attorney, Agent, or Firm* — Edwards Wildman Palmer LLP; Peter C. Schechter; Brian R. Landry

(57) ABSTRACT

The game apparatus indicates to a player the slide playing technique that not less than two of fret buttons are operated according to the alignment sequence thereof. When the operation in replay to the indication is evaluated, the game apparatus determines whether the operation for the slide playing technique has succeeded or not, under such condition that with respect to the operations of adjacent two fret buttons, the operation to the preceding fret button to be operated precedingly is detected, the operation to the next fret button to be operated next is detected, and after detecting the operation, the release operation of the preceding fret button is detected, the condition being at least one part of required condition.

10 Claims, 10 Drawing Sheets

GAME APPARATUS AND COMPUTER READABLE STORAGE MEDIUM FOR SIMULATED MUSICAL INSTRUMENT PLAYING TECHNIQUE

CROSS-REFERENCE TO RELATED APPLICATION

This application claims priority to Japanese Patent Application No. 2009-222846, filed Sep. 28, 2009. The entire contents of the aforementioned patent applications are incorporated herein by this reference.

BACKGROUND OF THE INVENTION

1. Field of the Invention

The present invention relates to a game apparatus and the like for allowing a player to simulate a performance and the like of a musical instrument.

2. Description of Background

As one type of game apparatus for allowing a player to simulate a performance of a musical instrument, there is already known a game apparatus comprising an input device in a guitar shape (sometimes called as a controller) having a plurality of fret buttons and a strum bar, in which operation timings of the fret buttons are shown on a game screen by being scrolled, and it is determined whether or not an operation performed by a player is successful depending on whether or not the player has operated the strum bar while operating the fret button within a permissible range for the operation timing indicated (for example, U.S. Pat. No. 7,459,624 and JP-A-2000-288254).

SUMMARY OF THE INVENTION

In the above conventional game apparatus, there is installed a device for requiring operations of the fret buttons for simulating playing techniques particular to a guitar such as the hammer-on and the pull-off on a guitar and evaluating a state of the operation performed by the user to the request. However, in a case an operation to simulate a playing technique like the slide playing technique, which allows a player to operate sequentially a plurality of operation portions according to an alignment sequence of the operation portions, is required to a player, it is not concerned in a conventional game apparatus how the state of operation to such requirement should be evaluated. Because of this, in a case of operating the operation portions sequentially, the factor such as fluidity is not take into account for the evaluation. Accordingly, Either a simple operation or a fluid operation is evaluated similarly, and thereby the diversity of operation methods of a game is limited, which causes that an inexpedience such that the game enjoyability is reduced could occur.

Then, the present invention aims to provide a game apparatus and the like for evaluating suitably a sequential operation of a plurality of operation portions such as a slide playing technique on a guitar, and thereby capable of realizing to diversify operation methods.

A first aspect of the present invention provides a game apparatus comprises: an input device which has a plurality of operation portions being aligned in a predetermined direction, and outputs a signal corresponding to a presence or absence of operation to each of the plurality of operation portions; a display device which display outputs a game screen; a sequence data storage device which stores sequence data in which operation timing of each of the operation portions while a game is progressing and information specifying one of the operation portions are described so as to be correlated to each other; an operation guidance device which presents on the game screen, the operation timing of each of the operation portions to a player based on the sequence data; and an operation evaluation device which determines an operation state of the player based on the signal output from the input device, and evaluates the operation by the player based on a comparison between a result determined and the sequence data, wherein the sequence data includes a sequential operation indication portion in which correlations between the operation portions and the operation timings are set so that not less than two of the operation portions which are aligned sequentially in the predetermined direction, are operated according to an alignment sequence thereof, the operation guidance device, when presenting the operation corresponding to the sequential operation indication portion, controls information for getting the player to recognize the operation corresponding to the sequential operation indication portion so as to be displayed on the game screen, and the operation evaluation device, when evaluating the operation corresponding to the sequential operation indication portion, determines whether the operation corresponding to the sequential operation indication portion has succeeded or not, under such condition as at least a part of required condition that, with respect to the operation states of the adjacent two operation portions, an operation to a preceding operation portion which should be operated precedingly has been detected, an operation to a next operation portion which should be operated next has been detected, and, after the operation to the next operation portion is detected, a release of the operation to the preceding operation portion is detected.

According to the game apparatus of the present invention, when a sequence of operations included in the sequential operation indication portion are presented to a player by the operation guidance device, it is determined whether the operation included in the sequential operation indication portion has succeeded or not, under such condition as at least a part of required conditions that, with respect to the operation states of adjacent two operation portions, an operation to the preceding operation portion which should be operated precedingly has been detected, an operation to the next operation portion which should be operated next has been detected, and, after the operation to the next operation portion is detected, a release of the operation to the preceding operation portion is detected. Accordingly, not only a viewpoint whether a player has operated each of the plurality of operation portions in a proper order or at a proper timing or not, it is possible to also take a mutual relationship of the operations, such that the preceding operation portion gets operated, as keeping the operation the next operation portion gets operated, and after that, the operation to the preceding operation portion gets released, into evaluation criteria. Thereby, it is possible to diversify operation methods in a game and enhance an enjoyability of the game.

In the game apparatus of the present invention, the sequential operation evaluation device may determine whether the operation corresponding to the sequential operation indication portion has succeeded or not, including in the required condition, further condition that an operation portion adjacent to a last operation portion on an opposite side, across the last operation portion, of an operation portion to be operated immediately prior to the last operation portion, has not been operated within a predetermined check time after the operation of the last operation portion, the last operation portion being specified in the sequential operation indication portion as an operation portion to be operated last. Thereby, even if the sequential operation corresponding to the sequential operation indication portion has been operated properly, in a case that, following after those operations, as well as not specified operation portion has been operated fast and furious, it is determined that the operation corresponding to the sequential operation indication portion has failed. Namely, with respect to the evaluation criteria of the sequential operation, it is possible to take, not only a determination whether required operations have been performed or not, also a determination whether any unnecessary operation has been performed or not. Thereby, it is possible to obtain the evaluation closer to a real situation and enhance further the enjoyability of the game.

The sequential operation evaluation device may determine whether the operation corresponding to the sequential operation indication portion has succeeded or not, including in the required condition, further condition that each of the sequential operations included in the sequential operation indication portion has been executed within a stipulated time which is set for each operation. Alternatively, the sequential operation evaluation device may determine whether the operation corresponding to the sequential operation indication portion has succeeded or not, including in the required condition, further condition that the sequential operations from a first operation up to a last operation included in the sequential operation indication portion have been executed within an operation period which is predetermined as some time-length in which the sequential operations should be executed. In a case that it is included in the required condition that each operation is performed within a stipulated predetermined time, the evaluation criteria of operation become restrict, as even the timing when each operation has been performed is related to the determination whether the operation has succeeded or not. On the other hand, in a case where it is included in the required condition that the sequential operations are performed within the operation period, it does not matter when each operation has been performed as long as the operation has been performed within the operation period. Thereby, with respect to the timing of each operation, it is possible to provide a moderate flexibility to a player.

As One embodiment of the present invention, the input apparatus may have an apparatus main body modeled after a guitar, a neck portion like a guitar may be provided to the apparatus main body, and a plurality of fret buttons as the plurality of operation portions may be provided on the neck portion in such a way that the plurality of fret buttons are aligned in a longitudinal direction of the neck portion. According to this embodiment, by the sequential operation corresponding to the sequential operation indication portion, it is possible to allow a player to experience the simulative slide playing technique on a guitar.

The game apparatus of the present invention may further comprises: a sound output device which reproduction outputs a game sound; a music piece data storage device which stores music piece data for a music piece to be reproduced; and a music reproduction device which controls the music piece so as to be reproduced from the sound output device based on the music piece data, wherein in the sequence data, operation timings of each of the plurality of operation portions which the music piece being reproduced and information specifying one of the operation portions may be described so as to be correlated to each other, the operation evaluation device, when a sequence of operations corresponding to the sequential operation indication portion being started, may control an effect sound for representing a state that a musical pitch changes sequentially so as to be outputted from the sound output device, and when it is determined that the sequence of operations failed, may terminate the output of the effect sound. According to this embodiment, when the sequential operation corresponding to the sequential operation indication portion is started, the effect sound is reproduced in such a way that the musical pitch sequentially changes, and when the sequential operations has failed, the output of the effect sound is terminated. Thereby, it is possible to provide a feeling close to the slide playing technique on a guitar to a player. Additionally, instead of terminating the output of the effect sound, a predetermined failure sound or the like may be controlled so as to be outputted as an effect sound.

In the game apparatus of the present invention, the operation guidance device may determine based on the sequence data, the operation timings to the operation portions which are included in a predetermined time range from a current time on the game toward a future, and, while controlling an operation indication marker corresponding to each of the operation timings determined and an operation criterion marker corresponding to the current time so as to displayed in such a way that the markers are disposed along a time axis on the game screen in a mode distinguishable between each of the operation portions, may change a relative positional-relation according to progress of time on the game between the operation criterion marker and the operation indication marker so that the operation indication marker coincides with the operation criterion marker at the operation timing to be presented by the operation indication marker. According to this embodiment, it is possible to get a player to recognize intuitively the operation timing of each operation portion, according to a distance between the operation criterion marker and the operation indication marker.

Further, the operation guidance device, when presenting the operation corresponding to the sequential operation indication portion, may control a sequential operation indication marker so as to be displayed as information for getting the player to recognize the operation corresponding to the sequential operation indication portion, the sequential operation indication marker being obtained by combining the operation indication markers corresponding to the sequential operation indication portion and an image for connecting the operation indication markers with each other. Thereby, it is possible to get a player to recognize intuitively that the sequential operation is being required.

Additionally, the operation guidance device may control the operation indication markers and the operation criterion marker so as to be displayed within an operation indication region which is sectionalized for each operation portion on the game screen in such a way that the markers are disposed along the time axis. According to this embodiment, it is possible for a player to recognize easily which operation portion the player should operate.

Another aspect of the present invention provides a computer readable storage medium storing a computer program for a game apparatus comprises: an input device which has a plurality of operation portions being aligned in a predetermined direction, and outputs a signal corresponding to a presence or absence of operation to each of the plurality of operation portions; a display device which display outputs a game screen; and a sequence data storage device which stores sequence data in which operation timing of each of the operation portions while a game is progressing and information specifying one of the operation portions are described so as to be correlated to each other, the sequence data including a sequential operation indication portion in which correlations between the operation portions and the operation timings are set so that not less than two of the operation portions which are aligned sequentially in the predetermined direction, are operated according to an alignment sequence thereof, and the computer program is constructed so as to make a computer of the game apparatus function as: an operation guidance device which presents on the game screen, the operation timing of each of the operation portions to a player based on the sequence data; and an operation evaluation device which determines an operation state of the player based on the signal output from the input device, and evaluates the operation by the player based on a comparison between a result determined and the sequence data, wherein the computer program is constructed so that the operation guidance device, when presenting the operation corresponding to the sequential operation indication portion, controls information for getting the player to recognize the operation corresponding to the sequential operation indication portion so as to be displayed on the game screen, and the operation evaluation device, when evaluating the operation corresponding to the sequential operation indication portion, determines whether the operation corresponding to the sequential operation indication portion has succeeded or not, under such condition as at least a part of required condition that, with respect to the operation states of the adjacent two operation portions, an operation to a preceding operation portion which should be operated precedingly has been detected, an operation to a next operation portion which should be operated next has been detected, and, after the operation to the next operation portion is detected, a release of the operation to the preceding operation portion is detected.

When the computer program stored in the computer readable storage medium of the present invention is executed by a computer of the game apparatus, it is possible to allow the game apparatus to function as a game apparatus of the present invention.

EFFECTS OF THE INVENTION

As described above, according to the present invention, with respect to a determination whether the sequential operation included in the sequential operation indication portion has succeeded or not, it is set as at least a part of the required condition that, the operation to the preceding operation portion which should be operated precedingly within the adjacent two operation portions has been detected, the operation to the next operation portion which should be operated next has been detected, and after the operation to the next operation portion is detected, a release of the operation to the preceding operation portion is detected. Accordingly, not only a viewpoint whether a player has operated each of the plurality of operation portions in a proper order or at a proper timing or not, it is possible to also take a mutual relationship of the operations, such that the preceding operation portion gets operated, as keeping the operation the next operation portion gets operated, and after that, the operation to the preceding operation portion gets released, into the evaluation criteria of the operation by the player. Thereby, it is possible to diversify operation methods of the game. Especially, if the present invention applied to a music game, by requiring a player to operate operations similar to the sequential operation such as the slide playing technique on a guitar, it is possible to enhance a reality of a game.

DETAILED DESCRIPTION OF THE INVENTION

Figure 1:
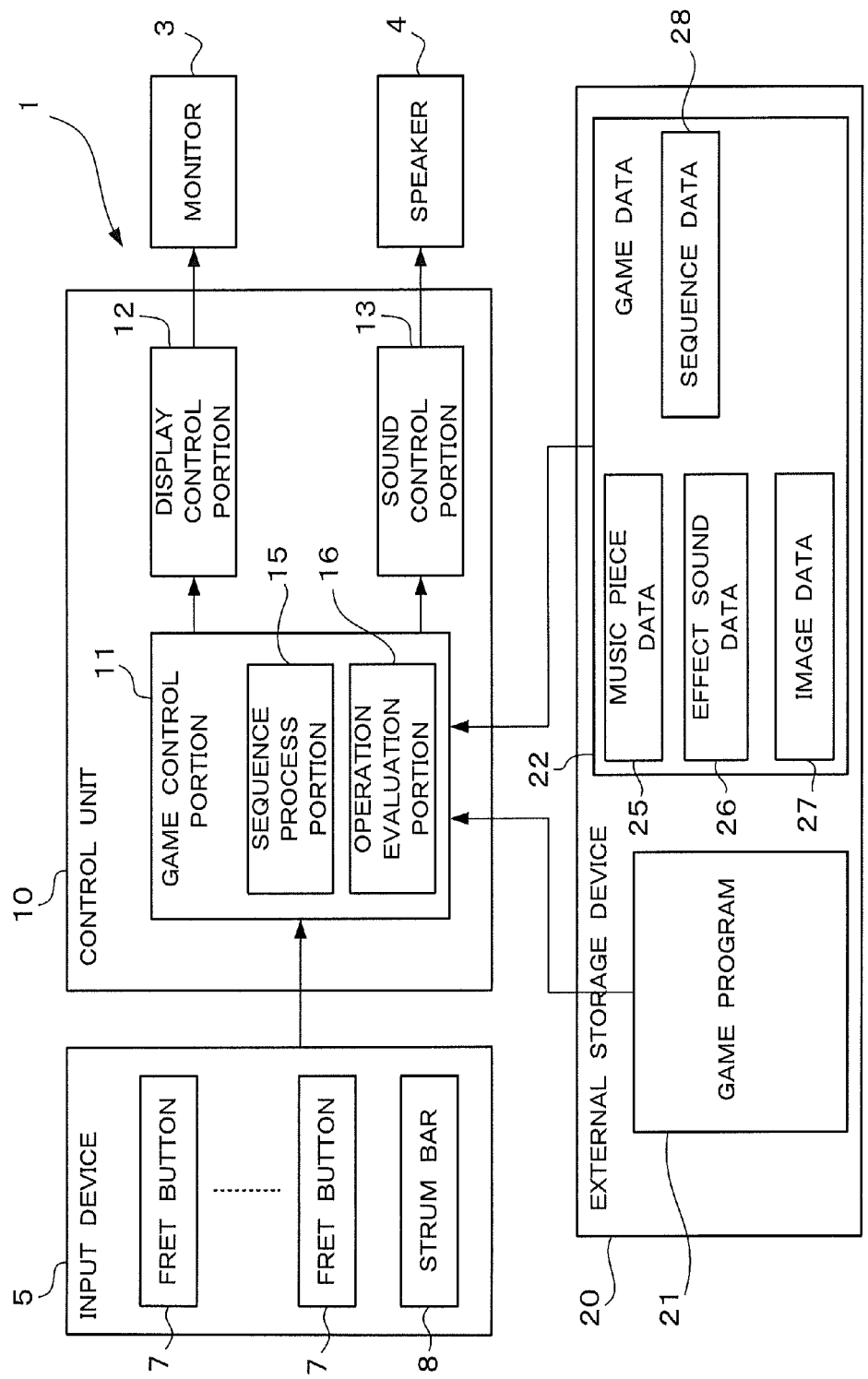
FIG. 1 is a functional block diagram of a game apparatus according to one embodiment of the present invention.

In what follows, referring to attached drawings, a game apparatus according to one embodiment of the present invention will be described. The game apparatus is configured as a music game apparatus for allowing a player to experience a simulation of guitar playing. The game apparatus can be configured as a game apparatus for home use or for consumer, or as a game apparatus for business use which is installed in a commercial equipment. As shown in FIG. 1, the game apparatus 1 comprises a control unit 10 as a computer. The control unit 10 comprises a game control portion 11 as a controlling entity, and a display control portion 12 and a sound output portion 13 which act by following the output from the game control portion 11. The game control portion 11 is configured as a unit obtained by combining a microprocessor and various kinds of periphery devices such as an internal storage device (as one example, a ROM and a RAM) necessary for operations of the microprocessor. The display control portion 12 draws on a frame butter, an image depending on the image data given from the game control portion 11, outputs a video image signal corresponding to the drawn image to a monitor 3 as a display apparatus, and thereby, displays a predetermined image on the monitor. The sound output control portion 13, by generating and outputting to a speaker 4 as a sound output device, a sound reproduction signal depending on the sound reproduction data given from the game control portion 11, controls a predetermined sound (including a music sound and the like) so as to be outputted from the speaker 4.

Figure 2:
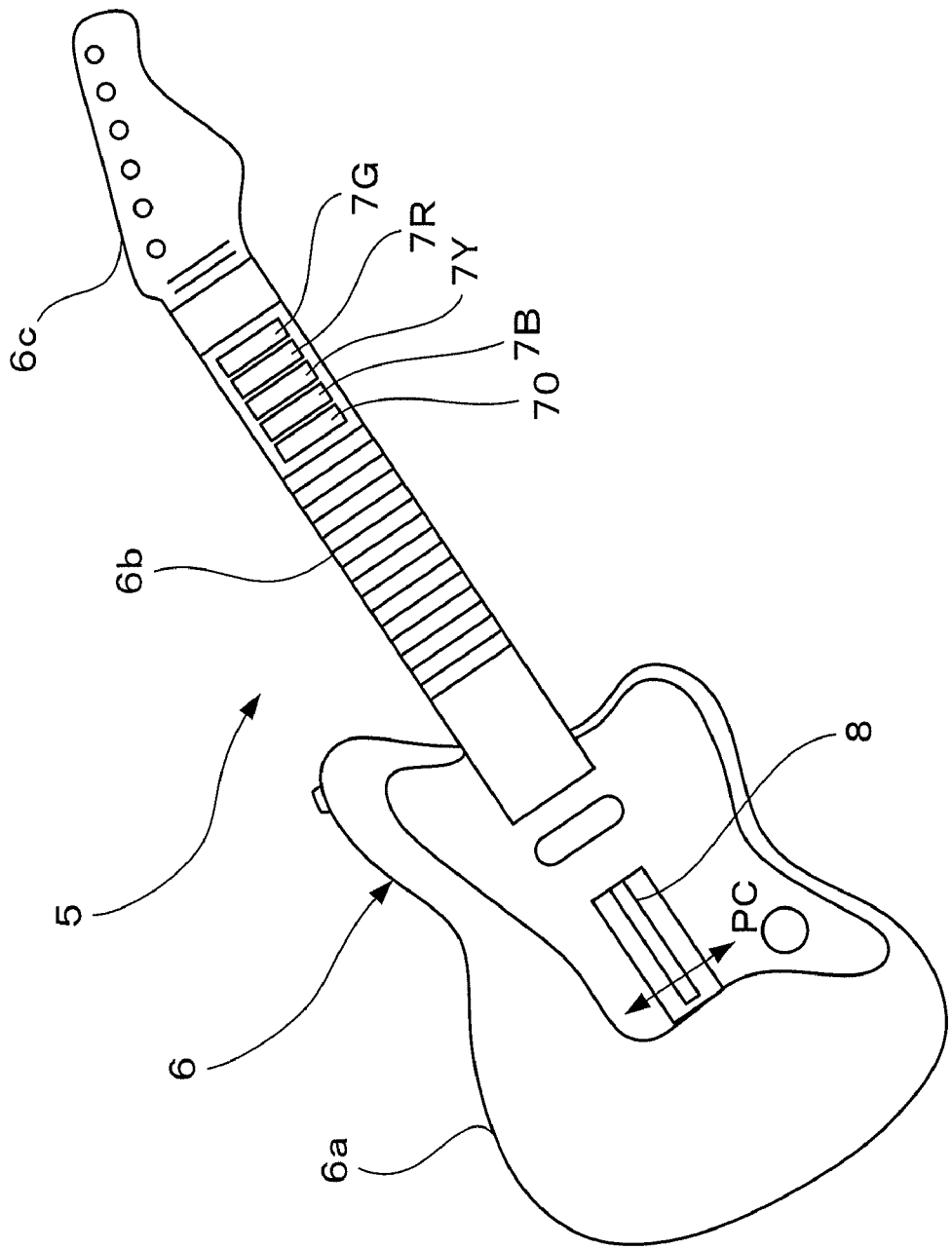
FIG. 2 is a front view of an input device provided in the game apparatus shown in FIG. 1.

To the game control portion 11, an input device 5 which accepts operations by a player is connected. As shown in FIG. 2, the input device 5 has a device main body 6 modeled after a guitar which is a musical instrument. In the device main body 6, like a guitar, a body portion 6a, a neck portion 6b, and a head portion 6c are provided. At the tip side (the head portion 6c existing side) of the neck portion 6b, five fret buttons 7G, 7R, 7Y, 7B, 7O (in what follows, when not needed to be distinguished, they are referred to as the fret button 7.

The same in FIG. 1.) are arranged in such a way that they are aligned along a longitudinal direction of the neck portion 6b with a constant pitch. Each of the fret buttons 7 is provided as an operation portion for simulating operations to a fret of a guitar. Each fret button 7 is configured as an on-off type press button which changes the output therefrom depending on whether a press operation has been performed or not. In what follows, the operation of pressing the fret button 7 represents as an ON operation, and "the fret button 7 has been turned ON" denotes that the ON operation has been performed and "the fret button 7 has been turned OFF" denotes that the ON operation has been released. Each fret button 7 is colored a unique color in order for a player to distinguish each. As one example, the fret button 7G is colored green, the fret button 7R is colored red, the fret button 7Y is colored yellow, the fret button 7B is colored blue, and the fret button 7O is colored orange.

On the other hand, a strum bar is provided at the almost center of the body portion 6a. The strum bar 8 is provided as an operation portion for simulating a pick playing on a guitar. The strum bar 8 is configured as a lever-type switch which is operable toward the both sides from a neutral position shown in the drawing in a direction that the picking operation should be performed. Inside the body portion 6a, an electronic circuit (not shown) is held for outputting operation states of the input device to the control unit 10. The electronic circuit generates and outputs to the control unit 10, a signal for determining whether each fret button 7 has been operated or not and a signal for determining an operated direction and an operated volume of the strum bar from the neutral position. Either wire communication or wireless communication can be applied to a communication method between the input device 5 and the control unit 10. As well as the fret buttons 7 and the strum bar 8, further operation portions can be provided in the input device 5 for accomplishing, for example, a purpose to be used for various kinds of operations necessary for executing a game (as one example, a selection operation in a game).

Returning to FIG. 1, to the game control portion 11, an external storage device 20 is connected to. As the external storage device 20, a storage medium capable of holding memory without electric supply is employed, for example, a nonvolatile semiconductor memory device, such as an EEPROM, or magnetic storage device. The storage medium of the external storage device 20 may be detachably attached to the game apparatus.

In the external storage device 20, a game program 21 and a game data 22 are stored. The game program 21 is a computer program necessary for executing a predetermined music game at the game machine. When the game apparatus starting up, the game control portion 11 executes various kinds of initial set contents necessary for functioning as the game apparatus 1 by executing the operation program stored in the internal storage device. Subsequently, the game control portion 11 loads and executes the game program 21 from the external storage device to set a situation for executing the music game by following the game program 21. By the execution of the game program 21, a sequence process portion 15 and the operation evaluation portion 16 are generated in the game control portion 11. The sequence process portion 15 and the operation evaluation portion 16 are logical devices which are realized by combining a computer hardware and a computer program. The sequence process portion 15 executes processes necessary for progressing the music game, for example, the sequence process portion 15 indicates an operation to the player according to a reproduction of a music piece selected by the player, or controls an effect sound so as to be outputted in reply to an operation by a player. The operation evaluation portion 16 executes processes, such as the evaluation of the operation by a player and the indication of sound output appropriate for the evaluation result. Additionally, by executing the game program 21, as well as the above mentioned logical devices, various kinds of logical devices may be generated in the game control portion 11.

In the game data 22, there are included various kinds of data which should be referred to when the music game is executed by following the game program 21. For example, in the game data 22, music piece data 25, effect sound data 26, and image data 27 are included. The music piece data 25 is data necessary for controlling the music piece as an object of the game so as to be reproduction outputted from the speakers 4. Although, in FIG. 1, One kind of music data 25 is shown, actually, the player can select a music piece to be reproduced from the plural music pieces. In the game data 22, the plural kinds of music piece data 25 are stored, to each of which information for distinguishing each of them is given. The effect sound data 26 is data including each of plural kinds of effect sounds which should be output from the speaker 4 in reply to an operation by a player, and a unique code which is unique for each kind of effect sound, so as to be correlated to each other. The effective sound includes various kinds of sounds of musical instruments and so forth. The image data 27 is data for controlling a back ground image, various kinds of objects, icons and the like in the game screen so as to be displayed on the monitor 3.

In the game data 22, the sequence data 22 is further included. The sequence data 28 is data where operations which should be presented to a player and the like are defined. To the music piece data 25 of one piece of music, at least one piece of sequence data 28 is prepared. For example, by changing a difficulty level to one piece of music, plural kinds of sequence data 28 may be prepared.

Figure 3:
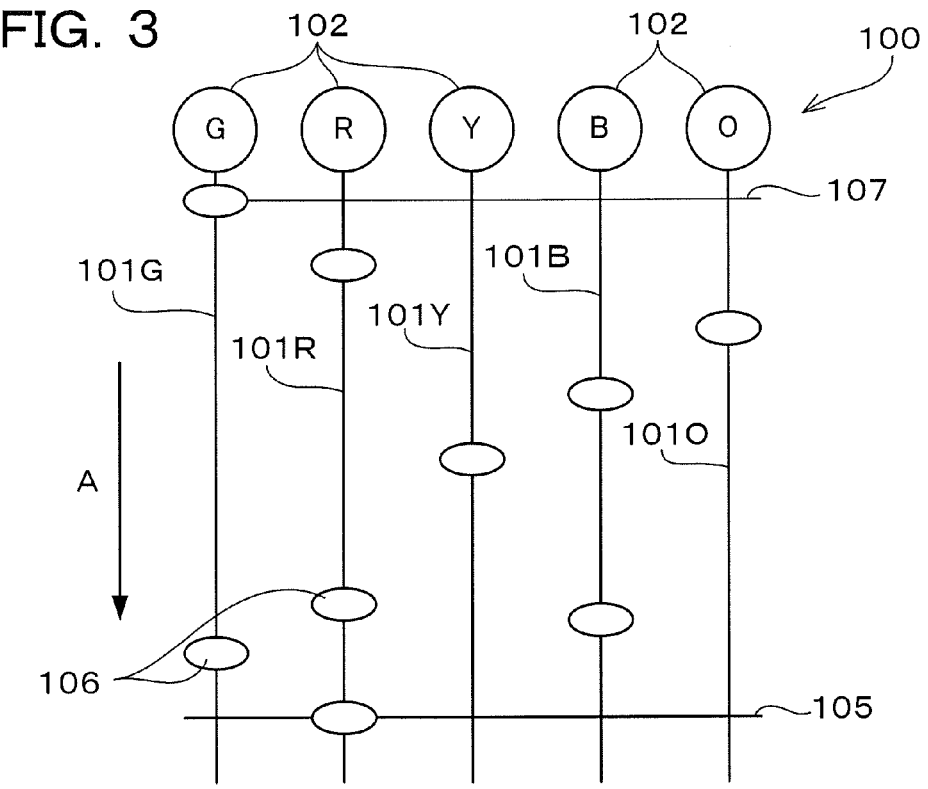
FIG. 3 is a diagram showing one example of an operation indication screen displayed on a monitor.

Next, the overview of music game executed in the game apparatus 1 will be described. While the music game being executed, in the monitor 3, an operation indication screen is displayed for teaching a player an operation to the input device 5. The schematic view of the operation indication screen is shown in FIG. 3. In the operation indication screen 100, five lanes 101G, 101R, 101Y, 101B, 101O (in what follows, when not necessary for distinguish each of them, they are referred to as the lane 101.) are displayed, the five lanes 101G, 101R,101Y,101B,101O being correlated to the fret buttons 7G, 7R, 7Y, 7B, 7O respectively. The alignment sequence of the lanes 101 is the same as the alignment sequence of the fret buttons 7. To each lane 101, a devisal for distinguishing the fret button 7 correlated to the lane 101 is provided. For example, on the top of the lane 101, a distinguishing portion which indicates the fret button 7 correlated to the lane 101 is provided. Alternatively, by coloring each lane 101 the color of corresponding fret button 7, the correlation of the lanes 101 and the fret buttons 7 may be distinguished. At the bottom end portion of the lane 101, the operation criterion marker 105 is displayed.

The operation criterion marker 105 is displayed in such a way that the operation criterion marker 105 extends linearly across the operation indication screen 100 in an alignment direction of the lanes 101. It is not necessary that the operation criterion marker 105 is linear. As long as the operation criterion marker 105 is displayed at an end portion of each lane 101, it does not matter which shape the operation criterion marker 105 has. Further, while the music game being executed, that is, while the music piece being reproduced, on each lane 101, an object 106 as an operation indication marker is displayed by following the sequence data. Note that the displayed figure of the lane 101 is one example, and the figure can be varied such that a zoning line is displayed at each border position between the lanes 101, or the lane 101 in a band shape is displayed. Moreover, it is enough that each lane 101 exists as a region where the object 106 travels. The display of lane may be omitted, and instead of that, the object 106 is colored different color for each lane so that the exist of each lane which corresponds to the fret button 7 on a one-to-one relationship is recognized. Each moving route of the object 106 which is zoned by the lane 101 corresponds to an operation indication region.

The object 106 appears at a start position 107 existing the top end portion of the lane 101 at a appropriate timing in the music piece being reproduced, and travels downward as an arrow A shown in FIG. 3 as the progress of the music piece being reproduced. When a player operates the strum bar 8 while pressing the fret button 7 at the timing when the object 106 reaches the operation criterion maker 105, it is determined whether the fret button 7 (hereinafter, referred to as the specified fret button) corresponding to the lane 101 where the object 106 is displayed has been turned on or not. When the specified fret button has been turned on, a gap of time between the time when the strum bar 8 was operated in connection with the ON operation and the time when the object 106 overlapped the operation criterion marker 105 is calculated. The operation by the player is evaluated based on the gap of time. The smaller the gap of time is, the more highly the operation by the player is evaluated. When the specified fret button has not been turned on, the evaluation gets lower, or the operation is treated as an ineligible case for evaluation. In an example in FIG. 3, the object 106 reaches the operation criterion marker 105 on the lane 101R corresponding to the fret button 7R. Accordingly, a player is required to operate the strum bar 8 while keeping the ON operation to the fret button 7R.

As mentioned above, in a music game which is executed in the game apparatus 1, a player is required, in principle, to operate the strum bar 8 while keeping the ON operation to the fret button 7 (hereinafter, this operation is sometimes referred to as "the connection operation"). As the connection operation is similar to a guitar playing technique performed by picking a string while pressing an appropriate fret of a real guitar, it is possible to give to a player a feeling of playing the guitar. However, the guitar playing techniques include special guitar techniques, such as the hammer on for getting the pitch of a sound higher by stroking a string with a finger at a higher tone side than a position where the fret is pressed, the pull-off for getting the pitch of a sound lower by releasing from a string, a finger pressing the string, while scratching the string, and the slide playing technique for changing the pitch of a sound a sound sequentially by sliding along the neck portion, a finger pressing a string. Then, the game apparatus 1 has a function of indicating the operation of simulating the slide playing technique to a player, and evaluating the operation performed by the player in reply to the indication.

Figure 4:
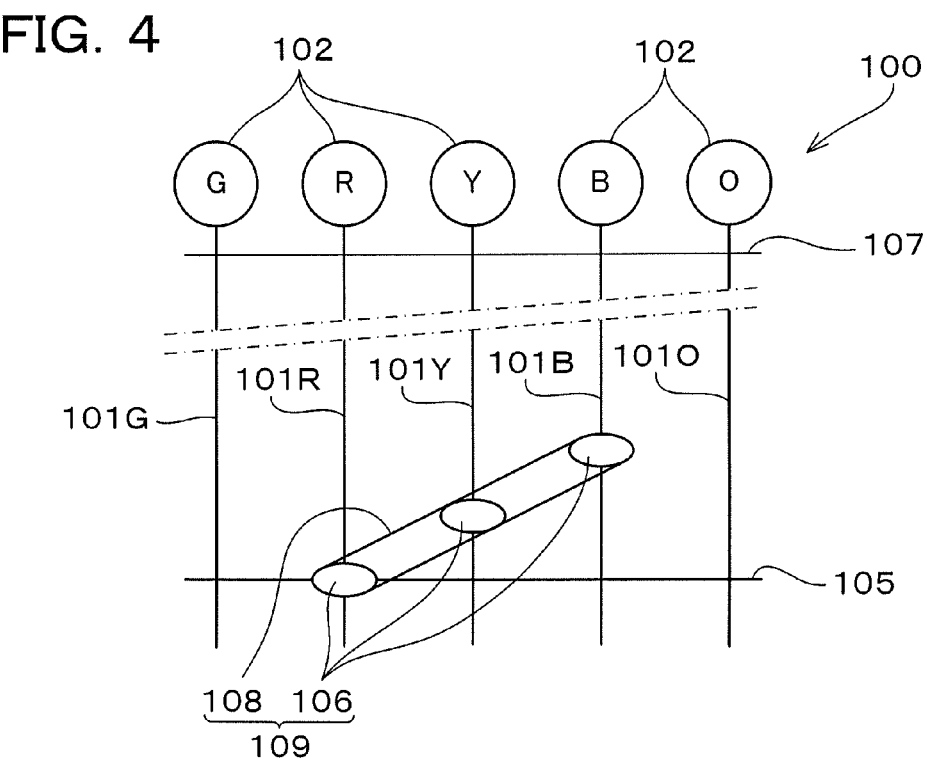
FIG. 4 is a diagram showing one example of an operation indication screen when a slide playing technique being presented.

FIG. 4 shows an example of display embodiment of the operation indication screen 100 when indicating the slide playing technique to a player. In this example, on each of the lanes 101R, 101Y, 101B, the objects 106 are displayed in a temporal order depending on the alignment sequence thereof. Thereby, the on-operations of the sequential three fret buttons 7R, 7Y, 7B on the neck portion 6*b* are presented in accordance with their alignment sequence. Then, a slide playing technique indication image 108 is also displayed for making a player recognize that the slide playing technique is being indicated. The slide playing technique indication image 108 is displayed in such a way that, for example, plural objects 106, the objects of the slide playing technique, are connected with each other. By combining the slide playing technique indication image 108 and the objects 106 distinguished by the slide playing technique indication image 108, the slide playing technique indication marker 109 is formed. The slide playing technique indication marker 109 functions as information for making the player recognize the operation of the sequential operation indication portion. In a case that the slide playing technique indication marker 109 is displayed, the player is required to perform the on-operation to the fret button 7 in accordance with the order that each of the objects 106 included in the marker 109 reaches the operation criterion marker 105. Thereby, it is possible to allow the player to experience the simulated feeling of playing the guitar while sliding a finger on the neck portion like a real slide playing technique. In what follows, a sequence of operations indicated by the slide playing technique indication marker 109 is called the slide playing technique in the music game of the present embodiment.

Figure 5:
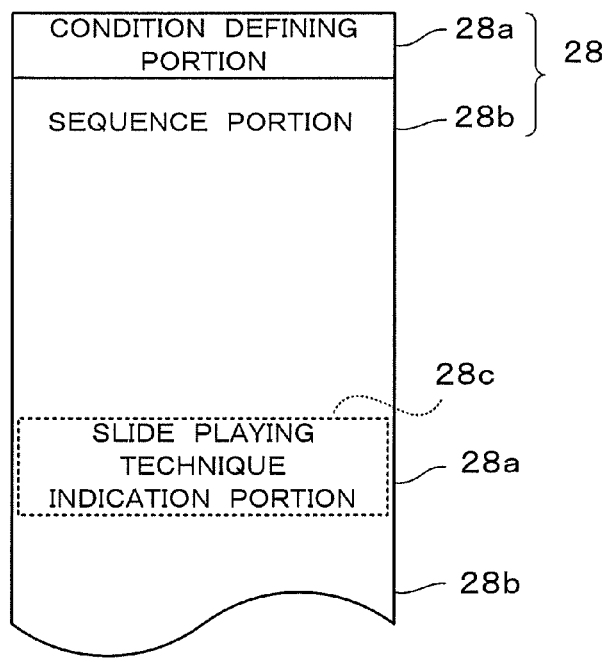
FIG. 5 is a diagram showing one example of data structure of sequence data.

Next, referring to FIG. 5, the sequence data 28 will be described. As shown in FIG. 5, the sequence data 28 includes a condition defining portion 28*a* and a sequence portion 28*b*. In the condition defining portion 28*a*, information specifying execution condition of game which differ from one music piece to another is described, such as the tempo of the music piece (as one example, BPM), information specifying an effect sound to be outputted when a player performs the connection operation or the operation for the slide playing technique, and information specifying an correlation between the gap of time of operation mentioned above and an evaluation.

On the other hand, in the sequence portion 28*b*, the operation timing of the fret button 7 or the like is described so as to be correlated with information specifying one of fret buttons 7. Namely, as a part of sequence portion 28*b* shown in FIG. 6, the sequence portion 28*b* includes plural records in each of which the timing (the operation timing) when to perform the operation during the music piece and information specifying the operation portion (the fret button 7) are correlated to each other. In each record, the operation timing is represented with comma to separate each value which indicates a bar number of the music piece, number of beats, and time in a beat. The time in a beat is an elapse time from the top of one beat, and is represented, when a time length of one beat being divided into n pieces of time unit, as the number of time units from the top of the beat. For example, in a case that under n=100, ¼ of time units elapsed from the top of the second beat in the first bar is specified as the operation timing, "01, 2, 025" is described in the sequence portion 28*b*. The operation portion is represented with an index for distinguishing the fret button 7 in a manner that "the button_G" is described when the fret button 7G being specified, "the button_R" is described when the fret button 7R being specified, and "the button_Y" is described when the fret button 7Y being specified. In an example shown in FIG. 6, the operation timings and the fret buttons to be operated are specified such that the fret button 7R is operated at a start point (000) of the first beat in the first bar, the fret button 7G is operated at a start point (000) of the second beat in the first bar, and the fret button 7B is operated at "024" of time units elapsed from the start point of the second beat in the first bar. In FIG. 5, the condition defining portion 28*a* is provided at only the top of the sequence data 28. However, also at an appropriate portion in the middle of the sequence portion 28*b*, a condition setting portion (not shown) may be provided, the condition setting portion including, similar to the condition defining portion 28*a*, the information specifying the tempo of music piece, the information specifying an effect sound to be outputted when the fret button 7 or the like being operated and the like. By providing such the condition setting information to the sequence portion 28b, it is possible to realize the change of tempo during the music piece, and the change of assignment of effect sounds.

Moreover, in the sequence portion 28b, there is also included a record (hereinafter, this record is sometimes referred to as the sound output specifying information), where information specifying an effect sound to be reproduced automatically while the music piece being progressing and an output timing of the effect sound are correlated to each other. In an example shown in FIG. 6, the record at the time "02, 1, 000", where "play. sound_001" is described, corresponds to the sound output specifying information. The record specifies that the effect sound data given a file name "sound_001" is controlled so as to be reproduced from the speaker 4 at the time. In a case that this record is read into the game control portion 11, when the output time specified comes, whichever the presence of absence of an operation by the player, the specified effect sound data is provided to the sound output control portion 13, and the effect sound corresponding to the effect sound data is controlled so as to be reproduced from the speaker 4.

Moreover, in the sequence portion 28b, the slide playing technique indication portion 28c specifying the slide playing technique is sometimes included. The slide playing technique indication portion 28c corresponds to a sequential operation indication portion of the present invention. As an example shown in FIG. 6, in the slide playing technique indication portion 28c, a record in which the operation timing and the letter string "start_slide" indicating a start of the slide playing technique are correlated to each other, is disposed at the top of the slide playing technique indication portion 28c, a record in which the operation timing and the letter string "end_slide" indicating an end of the slide playing technique are correlated to each other, is disposed at the end the slide playing technique indication portion 28c, and between these two records, there are arranged records where information indicating fret buttons 7 to be operated as objects of the slide playing technique and the operation timings are correlated to each other. In an example shown in FIG. 6, the period for the slide playing technique is a period from the time "000" of the first beat in the 10th bar of the music piece until the time "000" of the third beat from the 10th bar of the music piece. Between them, the records specifying the operations to the fret buttons 7R, 7Y, 7B are arranged in accordance with the alignment sequence of those fret buttons 7. That is, in the slide playing technique indication portion 28c shown in FIG. 6, it is required to turn the fret buttons 7R, 7Y, 7B on in this order. The slide playing technique indication portion 28c shown in FIG. 6 corresponds to a display example shown in FIG. 4.

Next, when the music game is executed in the game apparatus, the process executed by the game control portion 11 will be described. After reading the game program 21, when the game control portion 11 completes an initial set contents necessary to execute the music game, the game control portion 11 waits for an indication of game start from a player. The indication of game start includes the operations for specifying data to be used in the game, such as the selection of a music piece to be reproduced in the game and the selection of a difficulty level. The procedure of accepting these indications may be similar to the ones in the already known music game.

Figure 7:
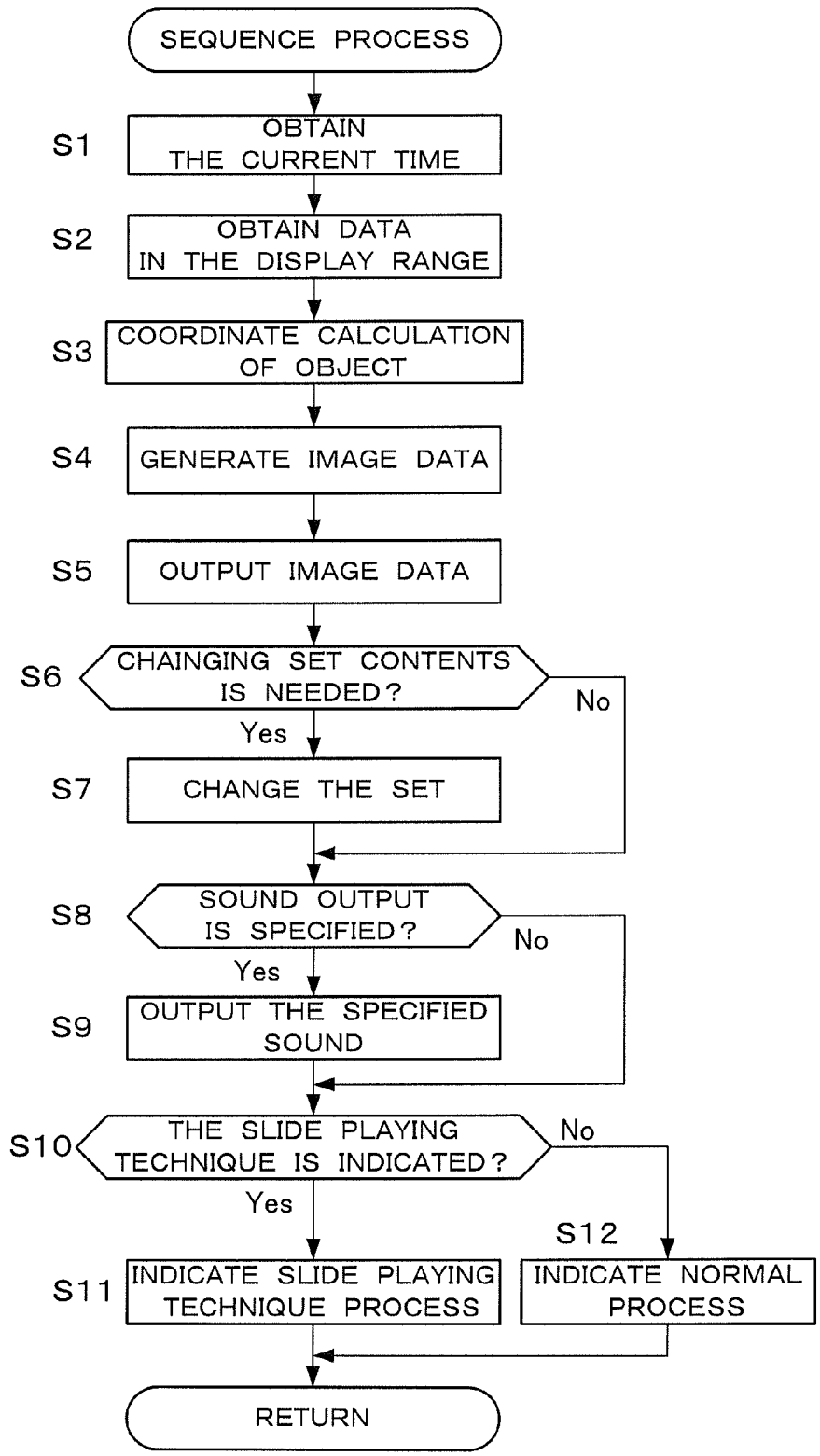
FIG. 7 is a flowchart showing a sequence process routine executed by a game control portion.

When the game start is indicated, by reading the music piece data 25 corresponding to the music piece selected by the player to output the data 25 to the sound output control portion 13, the game control portion 11 controls the reproduction of the music piece so as to be started from the speaker 4. Thereby, the control unit 10 functions as the music reproduction device. In addition, in synchronization with the reproduction of the music piece, the game control unit 11 reads the sequence data 28 corresponding to the selection of the player, and controls the operation indication screen 100 so as to be displayed on the monitor 3 by generating image data necessary for drawing the operation indication screen 100 as referring to the image data 27, and outputting the image data to the display control portion 12. Moreover, while the music game being executed, the game control portion 11 executes repeatedly a sequence process routine shown in FIG. 7 in a predetermined cycle. The routine shown in FIG. 7 is executed by the sequence process portion 15.

When the sequence process routine is started, the sequence process portion 15 of the game control portion 11, firstly at step S1, obtains the current time on the music piece. For example, regarding the reproduction start point of the music piece as a criterion, an inside clock of the game control portion 11 stats counting time, and the current time is obtained from the value of the inside clock. At subsequent step S2, the sequence process portion 15 obtains from the sequence data 28, data corresponding to the operation timings existing in the time length equal to the display range of the operation indication screen. The display range is set to be, for example, the time range of two bars of the music piece from the current time toward the future.

At subsequent step S3, the sequence process portion 15 calculates the coordinate values in the operation indication screen 100 for all objects 106 to be displayed on each lane 101. The calculation is executed, as one example, by the following process. It is determined which one of the lanes 101G, 101R, ... 101O the object 106 should be disposed on, based on the specified fret button 7 correlated to the operation timing included in the display range, that is, based on the specified "the button_G", "the button_R" ... or "the button_o" in the example shown in FIG. 6. Additionally, the position of each object 106 with respect to the time axis direction from the operation criterion marker 105 (that is, the traveling direction of the object 106) is determined in accordance with a difference of time between each of the operation timings and the current time. Thereby, it is possible to obtain the coordinate values of each object 106, the coordinate values necessary for disposing the object 106 along the time axis from the operation criterion marker 105 on the specified lane 101.

When the calculation for the coordinate values of the objects 106 is completed, the sequence process portion 15 goes to step S4, and generates the image data necessary for drawing the operation indication screen 100 based on the coordinate values of the objects 106 calculated at step S3. Specifically, the image data is generated so that the object 106 is disposed at the calculated coordinate values. The image of the object 106 can be obtained from the image data 27.

At subsequent step S5, the sequence process portion 15 outputs the image data to the display control portion 12. Thereby, the operation indication screen 100 is displayed on the monitor 3. After that, the sequence process portion 15 goes to step S6, and determines based on the data obtained at step S2 whether it is needed or not to change the set contents of the game condition. In this case, it is determined that it is needed to change the set contents, when the information specifying the change of execution condition of the game, such as the change of tempo of music piece and the change of assignment of effect sound to the operation to the fret button 7, is included within the range of sequence data 28 obtained at step S2, and the time when the change is specified coincides with the current time which is obtained at step S1. Then, in a case that an affirmative determination is obtained at step S6, the sequence process portion 15 goes to step S7 to change the execution condition of the game, and after that, goes to step S8. In a case that a negative determination is obtained at step S6, the process jumps to step S8 by skipping the process at step S7.

At step S8, the sequence process portion 15 determines whether the output of effect sound has been specified or not. That is, it is determined whether the time specified in the sound output specifying information shown in FIG. 6 coincides with the current time. In a case that the output of effect sound has been specified, the sequence process portion 15 goes to step S9 to provide to the sound output control portion 13 the effect sound data specified in the sound output specifying information, and controls the effect sound corresponding to the effect sound data so as to be reproduced from the speaker 4. This reproduction is done in the presence or absence of the player's operation. After the sound specified being output at step S9, the sequence process portion 15 goes to step S10. In a case that a negative determination is obtained, the process progresses to step S10, skipping the process of step S9.

At step S10, the sequence process portion 15 determines, based on the sequence data 28 obtained at step S2, whether the operation which the player should perform next is the operation included in the slide playing technique indication portion 28c or not. In a case that the operation is, the sequence process portion 15 goes to step S11 to indicate the slide playing technique process to the operation evaluation portion 16. On the other hand, at step S10, it is determined that the operation is not the operation included in the slide playing technique indication portion 28c, the sequence process portion 15 goes to step S12 to indicate a normal process to the operation evaluation portion 16. When the process at step S11 or step S12 is completed, the sequence process portion 15 terminates this routine.

Figure 8:
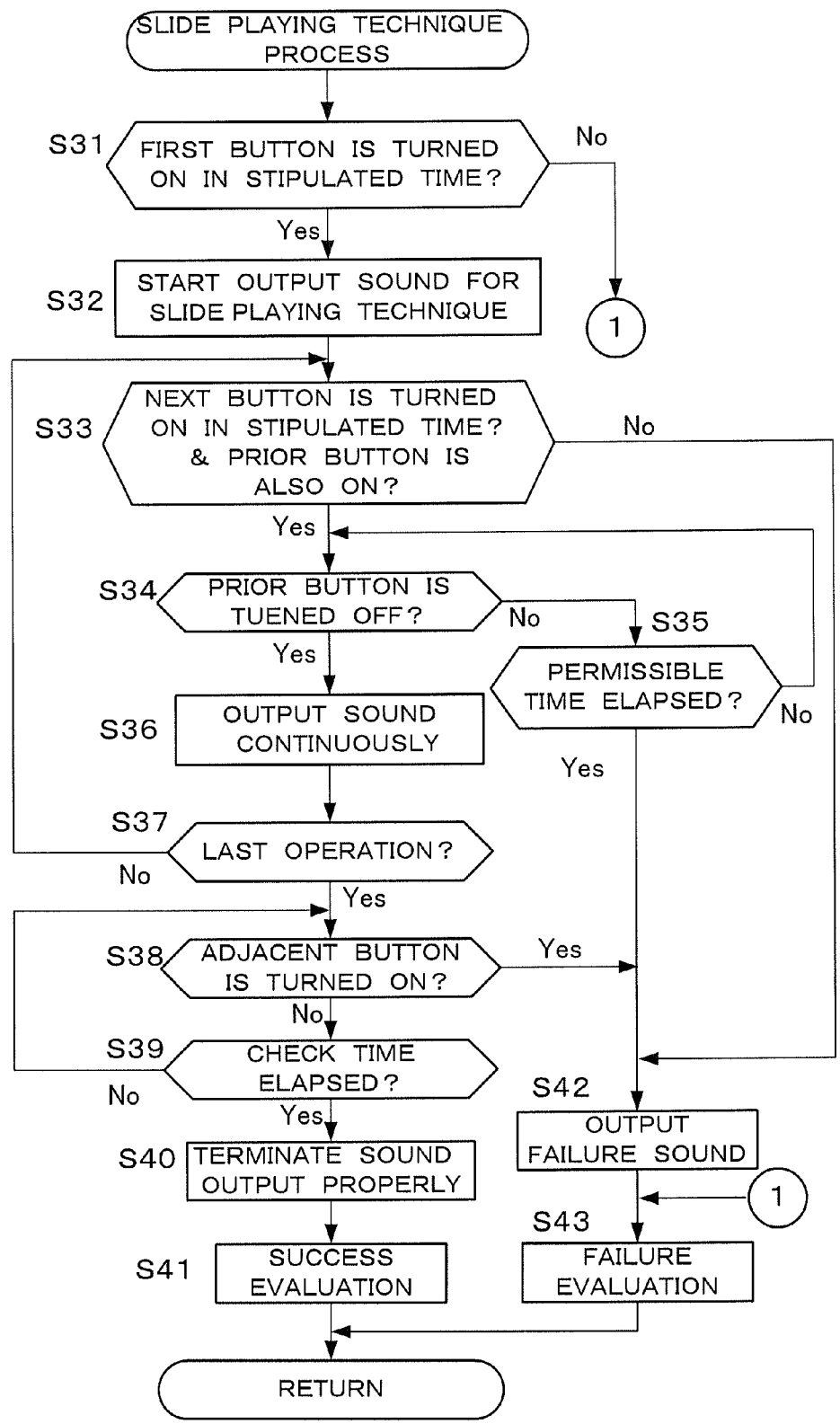
FIG. 8 is a flowchart showing a slide playing technique process routine executed by the game control portion.

On the other hand, the operation evaluation portion 16 starts a slide playing technique process routine shown in FIG. 8 when the slide playing technique process is specified at step S11 shown in FIG. 7. In the slide playing technique process routine, firstly at step S31, the operation evaluation portion 16 determines whether the fret button 7 which should be operated at the earliest time among the fret buttons 7 specified so as to be operated in the slide playing technique indication portion 28c (this button 7 is sometimes referred to as the first button), has been turned on within a stipulated time. The stipulated time at step S31 is set as a predetermined time including as a center, the operation timing which is specified for the first button 7 in the sequence data 28 (for example, in FIG. 6, the operation timing "10, 1, 000" is specified for the fret button 7R). Preferably, the stipulated time does not overlap with a stipulated time set for the fret button 7 to be next operated.

In a case that the first button has been turned on within the stipulated time at step S31, the operation evaluation portion 16 goes to step S32 to provide to the sound output control portion 13, the data of effect sound assigned as the sound which should be output at the moment of the slide playing technique, and controls the reproduction of the sound so as to be started. To the effect sound, an effect sound representing sequential change of musical pitch which occurs when the slide playing technique is played on a guitar is assigned.

At the subsequent step S33, the operation evaluation portion 16 determines whether the two conditions are satisfied or not, the one condition is that the fret button (the next button) 7 to be next operated has been turned on within the stipulated time and the other condition is that the prior fret button (the prior button) 7, that is, a fret button 7 before the fret button 7 which is an object to be determined at step S33 of this time has been turned on. At this step S33, the next button 7 and the prior button 7 corresponds to the next operation portion and the preceding operation portion respectively. As the stipulated time at step S33, a predetermined time is set, the predetermined time including, as a center, the operation timing being specified in the sequence data 28 for the fret button 7 (for example, in FIG. 6, the operation timing "10, 2, 000" corresponding to the fret button 7Y, or the operation timing "10, 3, 000" corresponding to the fret button 7B), the fret button 7 being an object to be determined with respect to the presence or absence of the operation at step S33. However, preferably, the stipulated time does not overlap with a stipulated time set for the fret button 7 to be next operated. Additionally, it does not matter whether the stipulated time at step S33 coincides with the stipulated time at step S31 or not.

In a case that the two conditions are satisfied at step S33, the operation evaluation portion 16 goes to step S34 to determine whether the prior button 7 has been turned off or not. In a case that the prior button 7 has not, the operation evaluation portion 16 goes to step S35 to determine whether the permissible time has been elapsed or not, the permissible time being set with respect to the off state of the prior button 7. As the permissible time, for example, a predetermined time from the moment when the next button 7 is turned on at step S33 is set. It does not matter whether the permissible time coincides with the stipulated time at step S31 or step S33.

At step S35, in a case that the permissible time has not been elapsed, the operation evaluation portion 16 returns to the process of step S34. At step S34, in a case that it is determined that the prior button 7 has been turned off, the operation evaluation portion 16 goes to step S36 to control the effect sound which started the output thereof at step S32 so as to be outputted continuously. At subsequent step S37, the operation evaluation portion 16 determines whether or not the operation to the next button 7 which was the object to be determined at step S33 is the last operation among the sequential operation included in the slide playing technique indication portion 28c (in what follows, this operation is sometimes referred to as the last operation.) In a case that the operation is not the last operation, the operation evaluation portion 16 returns to the process of step S33. On the other hand, in a case that it is determined the operation is the last operation at step S37, the operation evaluation portion 16 goes to step S38 to determine whether the adjacent fret button (the adjacent button) 7 has been turned on or not. The adjacent button 7 is a fret button 7 adjacent to the fret button 7 of the last operation at the opposite side of the fret button 7 which should be operated before the last operation. Namely, the process at step S38 is provided, in order to treat as a failure of the slide playing technique, such a case that even if a sequence of fret buttons 7 indicated in the slide playing technique indication portion 28c are operated in a proper order, following after these operations, the fret button 7 which is adjacent but not specified has been operated.

At step S38, the adjacent button 7 has not been turned on, the operation evaluation portion 16 goes to step S39 to determine whether a predetermined check time has elapsed or not. It does not matter whether or not the check time coincides with either the stipulated time at step S31 or step S33, or the permissible time at step S35. Then, in a case that the check time has elapsed at step S38, the operation evaluation portion 16 goes to step S40 and controls the output of the effect sound which started at step S32 so as to be terminated properly. For example, the operation evaluation portion 16 controls the effect sound so as to be outputted until the end of the effect sound data provided to the sound output control portion 13 at step S32, and terminates the output of the effect sound. Subsequently, the operation evaluation portion 16 goes to step S41, and stores the evaluation indicating a success of the slide playing technique to terminate the routine of this time.

On the other hand, in a case that it is determined that the condition of step S33 has not been satisfied, it is determined that the permissible time has elapsed at step S35, or it is determined that the adjacent button has been turned on at step S38, the operation evaluation portion 16 goes to step S42. At the step S42, the operation evaluation portion 16 provides the data of a predetermined failure sound to the sound output control portion 13 and controls the portion 13 to change from the effect sound to the failure sound, so that the failure sound is reproduced from the speaker 4 instead of the effect sound the output of which started at step S32. Subsequently, the operation evaluation portion 16 goes to step S43, and stores the evaluation indicating a failure of the slide playing technique to terminate the routine of this time. In addition, At step S31, in a case that it is determined that the first button 7 has not been turned on, the operation evaluation portion 16 executes the process of step S43 and terminates the routine of this time.

Figure 9:
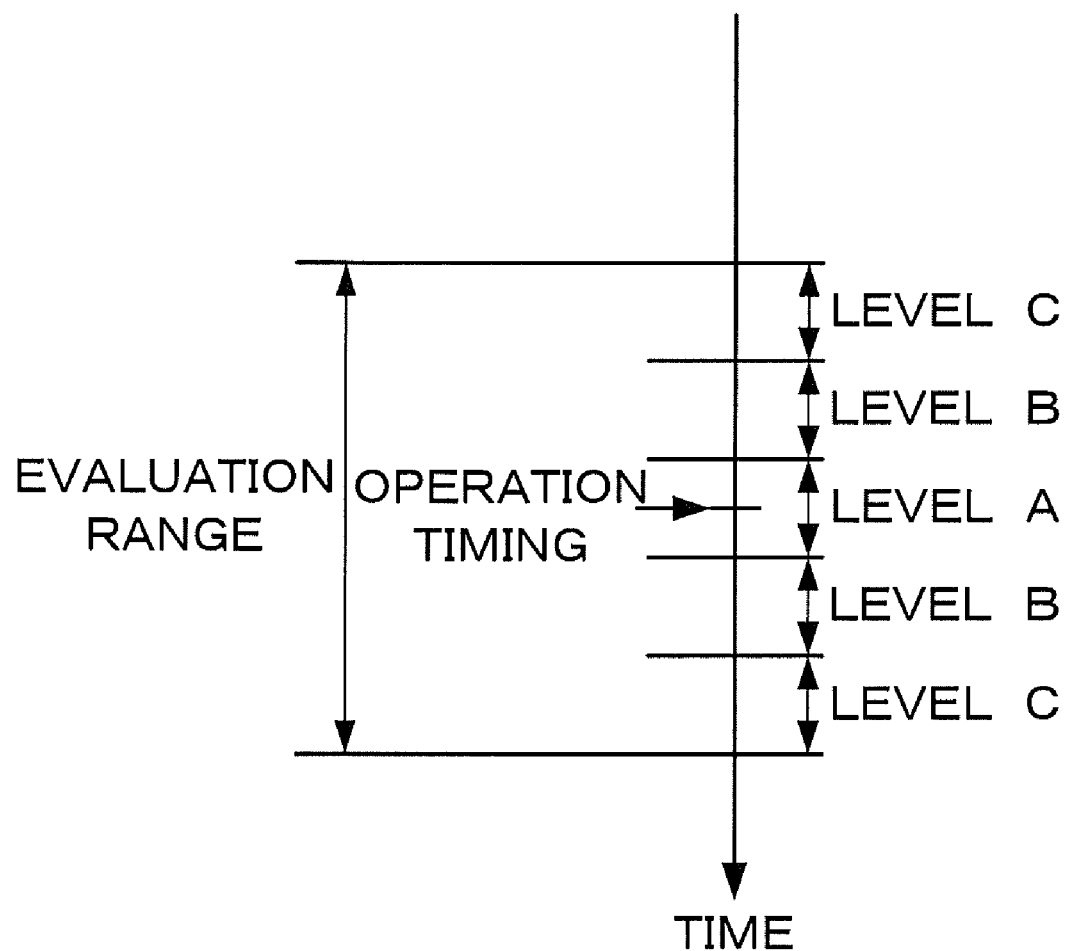
FIG. 9 is a diagram showing one example of relationship between an operation timing and a permissible range of operation when normal process being executed.

In a case that the normal process is specified at step S12 shown in FIG. 7, the operation evaluation portion 16 evaluates the operation by the player depending on whether or not the mentioned connection operation has been executed at the operation timing specified in the sequence portion 28b of the sequence data 28. In this evaluation, as shown in FIG. 9, a predetermined time range is set as an evaluation range, the predetermined time range including, as a center, the operation timing of the connection operation described in the sequence data 28, and moreover, in the evaluation range, a plurality of levels (in FIG. 9, the levels A to C) are set. In a case that the connection operation has been performed while the game being progressing, that is, in a case that the strum bar 8 has been operated in a state the fret button 7 is turned on, the operation by the player is evaluated in such a way that the gap of time between the timing when the strum bar has been operated and the specified operation timing is detected, and it is determined which level the gap of time is included in. As it is enough that the procedure of evaluation in the normal process is similar to the procedure of the already known music game, further explanation about this procedure is omitted.

As mentioned above, according to the game apparatus of the present embodiment, in order to obtain the evaluation indicating a sequence of operations to the fret buttons 7 included in the slide playing technique indication portion 28c, it is not enough that the player only performs the on-operation to the plural fret buttons in a specified order, and it is necessary that the fret buttons 7 are operated in series so that the on-operation is performed to the prior button 7 at the moment when the on-operation is performed to the next button 7, and after that, the prior button 7 gets turned off. Thereby, it is possible to make a player conscious of necessity that the plural fret buttons 7 are operated sequentially like he/she moves his/her fingers smoothly on the neck portion of a guitar. Thereby, it is possible to diversify the operation method which is required to a player in the game. In addition, it is possible to enhance the reality of music game by realizing the operation feeling close to the slide playing technique of the real guitar.

Further, even if a sequence of fret buttons 7 indicated by following the slide playing technique indication portion 28c are operated properly, in a case that the on-operation is performed subsequently in the check time also to adjacent button 7 which is not specified, it is determined that the slide playing technique failed. In the slide playing technique of the real guitar, the condition of change of musical pitch is made worse, not only when the moving volume of fingers pressing the neck portion is insufficient, but also when the moving volume of fingers is too much. By including in the condition for determination, a condition whether the on-operation has been operated or not to the adjacent button 7 which is not specified, it is possible to represent simulantly in the game, a bad situation in the case that the moving volume of fingers is too much. Thereby, it is possible to further enhance the reality of music game.

In the above mentioned embodiment, the external storage device 20 of the game apparatus 1 functions as the sequence data storage device and the music piece storage device. The control unit 10 functions as the operation guidance device by controlling the sequence process portion 15 to execute the processes of step S1 to step S5 in FIG. 7, and functions as the operation evaluation device by controlling the operation evaluation 16 to execute the processes corresponding to step S11 and step S12. The operation evaluation portion 16 functions as the sequential operation evaluation device by executing the slide playing technique process routine shown in FIG. 8.

Further, by also including in the condition for determining the operation succeeded, a condition that each of the operations included in the slide playing technique indication portion 28c has been operated within the stipulated time, it is possible to enhance the accuracy to be required to each operation in the slide playing technique, and make an evaluation criterion more strict.

Figure 10:
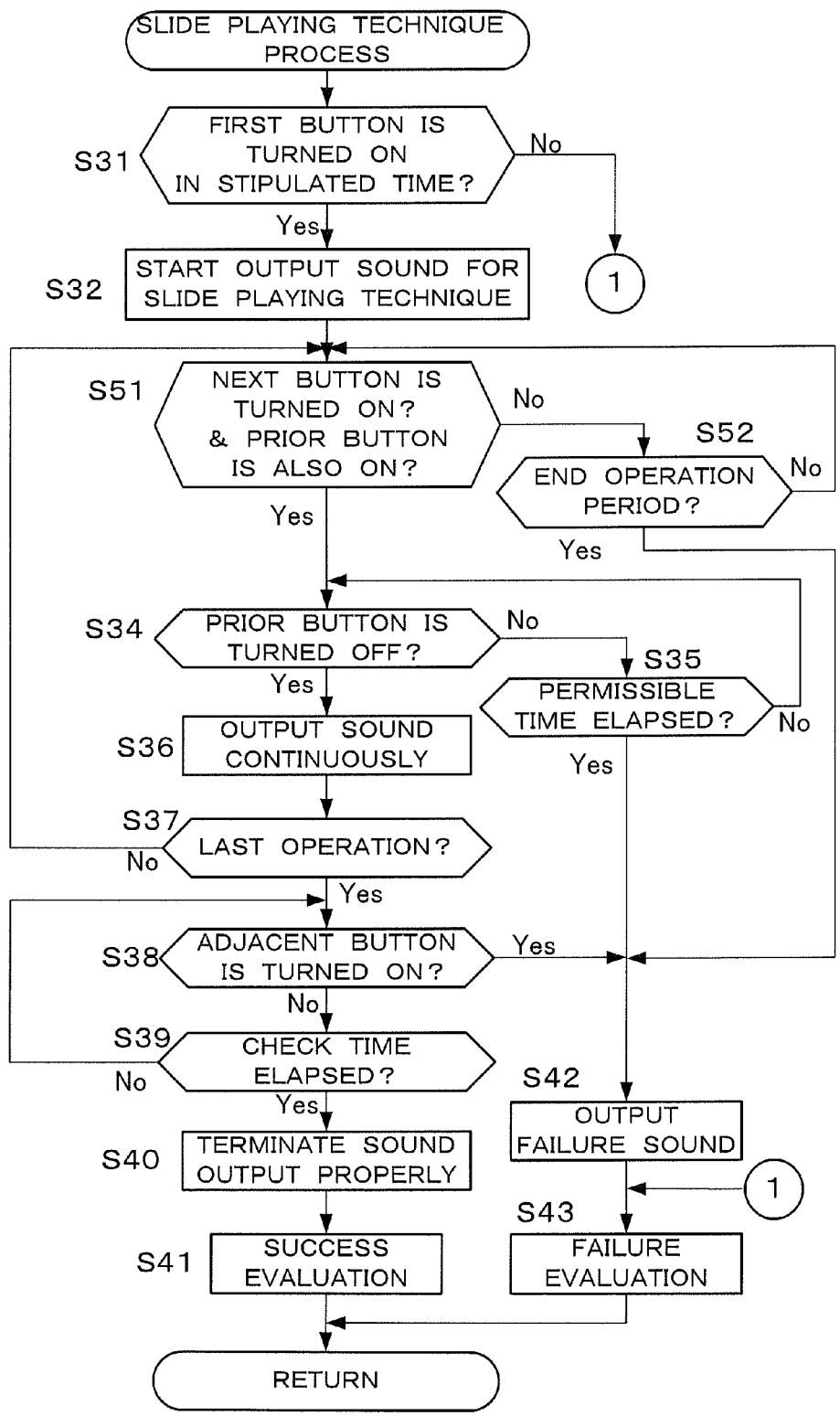
FIG. 10 is a flowchart showing a different embodiment of the slide playing technique process routine.

The present invention is not limited to the above mentioned embodiment, and can be realized in appropriate embodiments. For example, the operation evaluation portion 16 may be configured to function as the sequential operation evaluation device by executing the slide playing technique process routine shown in FIG. 10 instead of the routine shown in FIG. 8. In FIG. 10, to the processes same as the processes shown in FIG. 8, the same reference numbers are given. The different points will be mainly described. In the slide playing technique process routine shown in FIG. 10, after the output of sound for the slide playing technique was started at step S32, the operation evaluation portion 16 executes step S51 instead of step S33 shown in FIG. 8. In step S51, the operation evaluation portion 16 determines that the two conditions are satisfied or not, one condition is that the next button 7 has been turned on, and another condition is that the prior button 7 is also turned on. Namely, in step S51, it is not determined whether the on-operation has been performed to the adjacent button 7 within the stipulated time. In a case that the conditions of step S51 are not satisfied, the operation evaluation portion 16 goes to step S52 to determine whether a predetermined operation period has ended or not. In a case that the operation period has not ended, the operation evaluation portion 16 returns to the process of step S51. The operation period of step S52 is set to be a time-length in which a sequence of operations included in the slide playing technique indication portion 28c should be operated. With respect to the time counting of the operation period, for example, the time counting for the operation period can start at the same time as the start of the time counting for the stipulated time set for the first button 7. In a case that the condition of step S51 is satisfied, the operation evaluation portion 16 executes the processes after step S34 similarly to the routine of FIG. 8. On the other hand, in a case that, while the condition of step S51 being not satisfied, it is determined the operation period is terminated at step S52, the operation evaluation portion 16 regards the case as a failure of the slide playing technique, and goes to step S42.

As seen in the above, in the routine shown in FIG. 10, after the on-operation is performed to the first button 7 within the stipulated time, it does not matter when each of the fret buttons 7 is operated. The slide playing technique is evaluated as success, when each operation specified in the slide playing technique indication portion 28c has been preformed in a proper order, the last operation has been done within the predetermined operation period, and the adjacent button 7 which is not specified in the slide playing technique indication portion 28c has not been turned on in the check time. Therefore, comparing the example shown in FIG. 8, it is possible to give to a player moderate flexibility with respect to the timing of each operation during the slide playing technique. For example, it is possible to permit the situations that a sequence of operations are completed from the start of the slide playing technique in short bursts, or the timing of one operation in the sequential operations is changed depending on the player's demand. Thereby, it is possible to make a player experience an entertaining flexibility as if improvising. In a case that it is determined that the slide playing technique succeeded or not in the routine shown in FIG. 10, with respect to the slide playing technique indication portion 28c in the sequence data 28, it is enough that the operation timing of the fret button to be first operated (in FIG. 6, the fret button 7R) is set, and for the fret buttons 7 (in FIG. 6, the fret button 7Y and 7B) to be operated after the first button 7, the description of the operation timings corresponding to each of those fret buttons 7 can be omitted. Even in this case, by specifying the operation timing of the fret button 7 to be first operated, based on the operation timing specified and the operation period considered at step S52 of FIG. 10, the operation timing of each of fret buttons 7 to be operated after the first button 7 results in the timing having appropriate time range. Namely, in the present invention, in the sequential operation indication portion in the sequence data, the correlation between the operation timing of each of the operation portions and the information specifying the operation portion is not limited to the relation that the operation timing is correlated to each of the operation portion one by one. It is also included as the embodiment of the correlation, that, if the operation timing of one operation portion included in the sequential operation indication portion is defined, caused by the relation with the operation timing defined, the timing operations of each of the other operation portions can be stipulated naturally. Further, the correlation can be described in an appropriate embodiment, as long as it is specified when in the game each of the operation portions should be operated.

Figure 6:
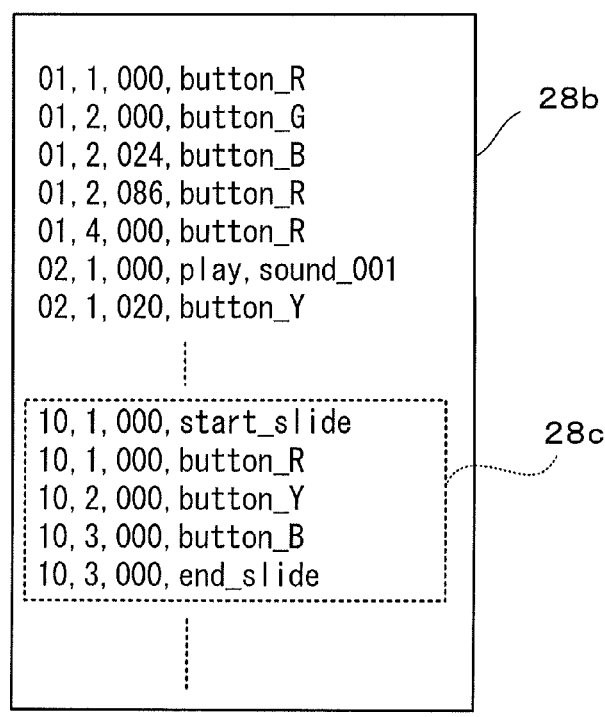
FIG. 6 is a diagram showing the details of a sequence portion.
Figure 11:
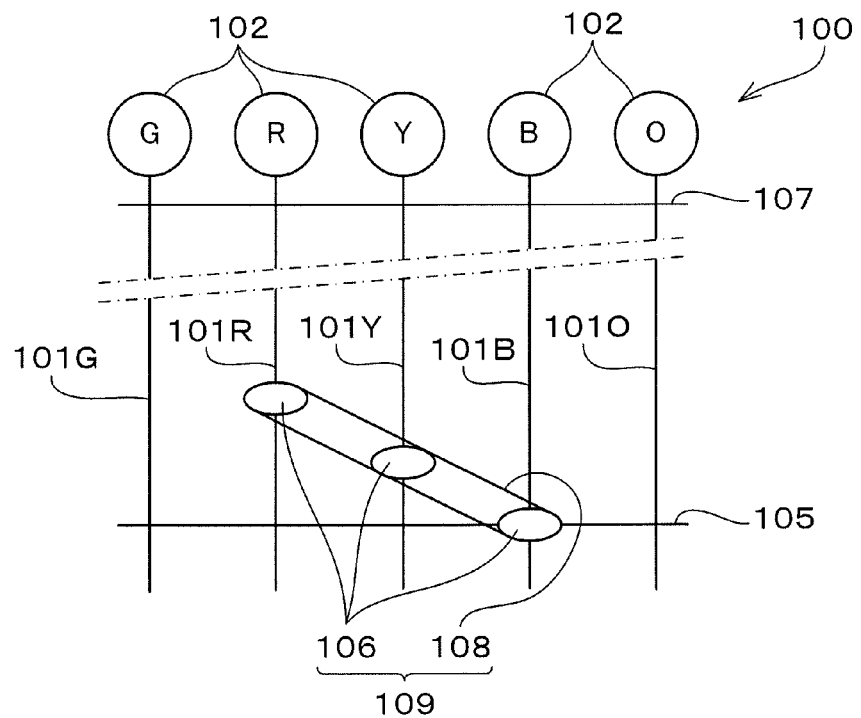
FIG. 11 is a diagram showing a different example of operation indication screen when the slide playing technique being presented.
Figure 12:
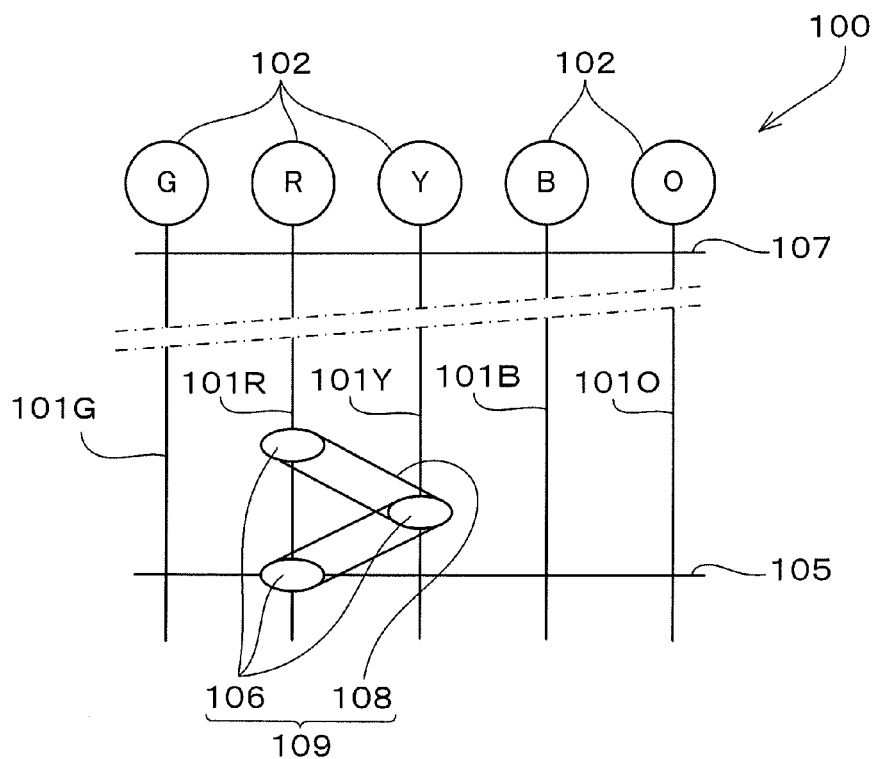
FIG. 12 is a diagram showing a further different example of operation indication screen when the slide playing technique being presented.

In the slide playing technique indication portion 28c shown in FIG. 6, the operation timing of each of three fret buttons 7R, 7Y, 7B is specified so as to operate the three fret buttons 7R, 7Y, 7B sequentially from the side of head 6c toward the side of body 6a. However, the operation order of fret buttons 7 for the slide playing technique is not limited to such order, and it is enough that the operation order is specified so that not less than 2 fret buttons 7 which are adjacent to each other are operated sequentially. For example, as shown in FIG. 11, the operation order of each of the fret buttons 7B, 7Y, 7R can be specified sequentially from the side of body 6a toward the side of neck portion 6b. Alternatively, by, for example, specifying sequentially the operation order of each of the fret buttons 7R, 7Y, 7R as shown in FIG. 12, it is possible to change halfway the direction of fret buttons 7 to be operated as the slide playing technique. Further, the number of fret buttons 7 the operation of which are required is not limited to 3, and the number can be appropriately changeable as long as not less than 2.

Figure 13:
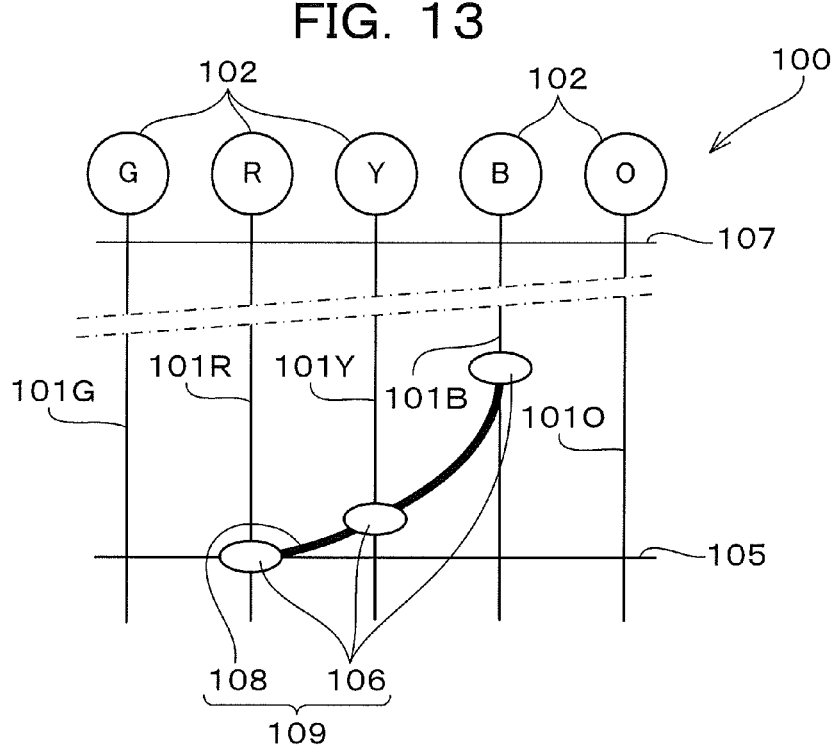
FIG. 13 is a diagram showing a different example of a slide playing technique indication marker.
Figure 14:
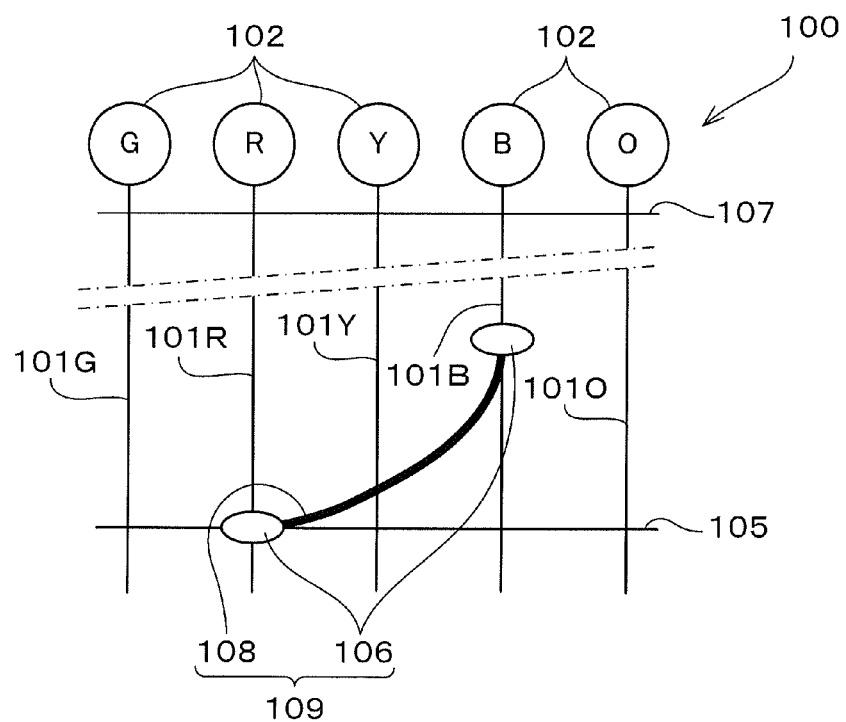
FIG. 14 is a diagram showing a further different example of a slide playing technique indication marker.

Additionally, the display embodiment of the slide playing technique indication marker 109 can be appropriately changed. For example, as shown in FIG. 13, the slide playing technique indication image 108 can be represented as an embodiment having a straight line shape or a curve line shape which passes through the center portions of the objects 106 which are objects of the slide playing technique. In a display example shown in FIG. 4, FIG. 11, FIG. 12 and FIG. 13, the slide playing technique indication marker 109 is constructed by combining the objects 106 corresponding to all of the fret buttons 7 to be operated as the slide playing technique and the slide playing technique indication image 108 connecting the objects 106. However, for example, an embodiment shown in FIG. 14 can be applied to the present invention. In FIG. 14, only two objects 106 each of which corresponds to the fret button 7R to be operated first and the fret button 7B to be operated last, and the slide playing technique indication image 108 connecting the two objects 106 are displayed, and the display of an object corresponding to the fret button 7Y to be operated halfway is omitted. Such display embodiment can be combined suitably with the routine of FIG. 10 where the operation timing of the fret button 7 to be operated halfway is not stipulated.

In the above embodiments, the example that the slide playing technique is indicated in the music game using the input device in the shape of a guitar was explained. The present invention is not limited to this embodiment. For example, the other musical instrument can be employed to the input device as long as plural operation portions are aligned in a predetermined direction, and not only a specific musical instrument, a versatile input device can be employed to the input device. The direction where the plural operation portions are aligned is not limited to the direction of a strait line, the plural operation portions can be aligned along a curve line, a circular arc or the like. Also, a sequence of operations corresponding to the sequential operation indication portion are not limited to the operations to be indicated to a player in order to simulate the slide playing technique on a guitar. For example, in a case that a sequential operation to plural operation portions aligned sequentially, such as the operation that plural keys are played sequentially, is required in a game as a sequence of operations corresponding to the sequential operation indication portion of the present invention, the present invention can be applied to this case in order to be determined whether the operation succeeded or not.

With respect to the operation guidance device, the relative positional change between the operation indication marker and the operation criterion marker may be realized, by, not moving the operation indication marker, moving the operation criterion marker. In this case, the display of the markers may be controlled in such a way that the operation indication markers are updated at once for each display range (for example, the time-length of two bars.), and the operation criterion marker moves from a start position to a destination position every time the display range is updated. The operation guidance device can indicate operations by an embodiment different from the embodiment where the operation indication marker is displayed in each of the operation indication regions which are sectionalized to each other for each operation portion, as long as the operation indication marker is displayed in a situation the corresponding operation portion is distinguishable. For example, symbols are assigned to the plural operation portions respectively, the symbols being different from each other, and the operation indication symbols are set so as to vary for each operation portion according to the symbol. Thereby, even if the operation indication markers corresponding to the plural operation portions are disposed in the same operation indication region, a player can distinguish which one of the plural operation portions should be operated. The information for making a player recognize the sequential operation indication portion is not limited to the example such that the information is displayed in relation to the operation indication markers like the slide playing technique indication marker 109. For example, the variation can be applied, such that a text message or the other information for requiring the sequential operation is displayed on the game screen.

The invention claimed is:

1. A game apparatus comprising:
   an input device including a plurality of operation portions being aligned in a predetermined direction and adapted and configured to output a signal indicating whether each of the plurality of operation portions is actuated;
   a display device adapted and configured to display a game screen;
   a sequence data storage device adapted and configured to store sequence data, in which operation timing of each of the operation portions in an ongoing game and information specifying the operation portions to be operated are correlated to each other;
   an operation guidance device adapted and configured to present on the game screen the operation timing of each of the operation portions to a player based on the sequence data; and
   an operation evaluation device adapted and configured to determine an operation state of the player based on the signal output from the input device, and evaluate the operation state of the player based on a comparison between the operation state determined and the sequence data, wherein
   the sequence data includes a sequential operation indication portion indicating sequential operations in which correlations between the operation portions and the operation timings are set so that at least two adjacent operation portions are operated according to an alignment sequence thereof,
   the operation guidance device is further adapted and configured to, when presenting the operation corresponding to the sequential operations, cause the display device to display one or more technique indication image on the game screen corresponding to the sequential operations, and
   the operation evaluation device is further adapted and configured to, when evaluating the sequential operations, determine whether the sequential operations are successful or not, based on a required condition that:
   (a) with respect to operation states of two adjacent operation portions, (i) a first operation to a preceding operation portion that should be operated precedingly is detected, (ii) subsequently, a second operation to a next operation portion that should be operated is detected, and, (iii) after the second operation is detected, a release of the first operation is detected and
   (b) the sequential operation does not extend beyond a last operation portion specified in the sequential operation indication portion, as determined by evaluating whether an operation portion adjacent to the last operation portion on an opposite side of the last operation portion with respect to the preceding operation portion is not operated within a predetermined time period.

2. The game apparatus of claim 1, wherein the required condition further requires that each of the sequential operations included in the sequential operation indication portion has been executed within a stipulated time which is set for each operation.

3. The game apparatus of claim 1, wherein the required condition further requires that the sequential operations from a first operation up to a last operation included in the sequential operation indication portion have been executed within an operation period which is predetermined as some time-length in which the sequential operations should be executed.

4. The game apparatus of claim 1, wherein the input device has an apparatus main body modeled after a guitar, a neck portion like a guitar is provided to the apparatus main body, and a plurality of fret buttons as the plurality of operation portions are provided on the neck portion in such a way that the plurality of fret buttons are aligned in a longitudinal direction of the neck portion.

5. The game apparatus of claim 4, wherein at least one of the sequential operations is a slide playing technique.

6. The game apparatus of claim 1 further comprising:
   a sound output device which reproduction outputs a game sound;
   a music piece data storage device which stores music piece data for a music piece to be reproduced; and
   a music reproduction device which controls the music piece so as to be reproduced from the sound output device based on the music piece data, wherein
   in the sequence data, operation timings of each of the plurality of operation portions which the music piece being reproduced and information specifying one of the operation portions are described so as to be correlated to each other,
   the operation evaluation device, when a sequence of operations corresponding to the sequential operation indication portion being started, controls an effect sound for representing a state that a musical pitch changes sequentially so as to be outputted from the sound output device, and when it is determined that the sequence of operations failed, terminates the output of the effect sound.

7. The game apparatus of claim 1, wherein:
   the operation guidance device determines based on the sequence data, the operation timings to the operation portions which are included in a predetermined time range from a current time on the game toward a future, and,
   while controlling an operation indication marker corresponding to each of the operation timings determined and an operation criterion marker corresponding to the current time so as to be displayed in such a way that are disposed along a time axis on the game screen in a mode distinguishable between each of the operation portions,
   changes according to progress of time on the game a position relation between the operation criterion marker and the operation indication marker so that the operation indication marker coincides with the operation criterion marker at the operation timing which should be indicated by the operation indication marker.

8. The game apparatus of claim 7, wherein the operation guidance device, when presenting the operation corresponding to the sequential operation indication portion, controls a sequential operation indication marker so as to be displayed as information for getting the player to recognize the operation corresponding to the sequential operation indication portion, the sequential operation indication marker being obtained by combining the operation indication markers corresponding to the sequential operation indication portion and an image for connecting the operation indication markers with each other.

9. The game apparatus of claim 8, wherein the operation guidance device controls the operation indication markers and the operation criterion marker so as to be displayed within an operation indication region which is sectionalized for each operation portion on the game screen in such a way that the operation indication marker and the operation criterion marker are disposed along the time axis.

10. A non-transitory computer readable storage medium storing a computer program for a game apparatus comprising:
an input device including a plurality of operation portions being aligned in a predetermined direction and adapted and configured to output a signal indicating whether each of the plurality of operation portions is actuated;
a display device adapted and configured to display a game screen; and
a sequence data storage device adapted and configured to store sequence data, in which operation timing of each of the operation portions in an ongoing game and information specifying the operation portions to be operated are described so as to be correlated to each other, the sequence data including a sequential operation indication portion indicating sequential operations in which correlations between the operation portions and the operation timings are set so that at least two adjacent operation portions are operated according to an alignment sequence thereof, the computer program is constructed so as to make a computer of the game apparatus function as:
an operation guidance device adapted and configured to present on the game screen the operation timing of each of the operation portions to a player based on the sequence data; and
an operation evaluation device adapted and configured to determine an operation state of the player based on the signal output from the input device, and evaluate the operation state of the player based on a comparison between a the operation state determined and the sequence data, wherein the computer program is constructed so that:
the operation guidance device is further adapted and configured to, when presenting the operation corresponding to the sequential operations, cause the display device to display one or more technique indication image on the game screen corresponding to the sequential operations, and the operation evaluation device is further adapted and configured to, when evaluating the sequential operations, determine whether the sequential operations are successful or not, based on a required condition that:
(a) with respect to operation states of two adjacent operation portions, (i) a first operation to a preceding operation portion that should be operated precedingly is detected, (ii) subsequently, a second operation to a next operation portion that should be operated is detected, and, (iii) after the second operation is detected, a release of the first operation is detected and
(b) the sequential operation does not extend beyond a last operation portion specified in the sequential operation indication portion, as determined by evaluating whether an operation portion adjacent to the last operation portion on an opposite side of the last operation portion with respect to the preceding operation portion is not operated within a predetermined time period.

* * * * *